US006933884B2

(12) United States Patent
Martin et al.

(10) Patent No.: US 6,933,884 B2
(45) Date of Patent: Aug. 23, 2005

(54) SYSTEM FOR TRACKING AND MONITORING VESSELS (76) Inventors: Kenneth L. Martin, 117 Woodbridge Way, Simpsonville, SC (US) 29881; Alfred F. Behrendt, 499 E. Sheridan St., Suite 300, Dania Beach, FL (US) 33004

( * ) Notice: Subject to any disclaimer, the term of this patent is extended or adjusted under 35 U.S.C. 154(b) by 0 days.

(21) Appl. No.: 10/491,485

(22) PCT Filed: Oct. 2, 2002

(86) PCT No.: PCT/US02/31796

§ 371 (c)(1),
(2), (4) Date: Apr. 1, 2004

(87) PCT Pub. No.: WO03/029837

PCT Pub. Date: Apr. 10, 2003

(65) Prior Publication Data

US 2004/0217900 A1 Nov. 4, 2004

Related U.S. Application Data (60) Provisional application No. 60/326,915, filed on Oct. 3, 2001.

(51) Int. Cl.[7] ............................................. H04B 7/185
(52) U.S. Cl. ........................... 342/357.07; 342/357.06; 342/357.09
(58) Field of Search ....................... 342/357.01, 357.06, 342/357.07, 357.09, 357.1; 701/207, 213; 455/12.1, 13.1

(56) References Cited

U.S. PATENT DOCUMENTS

| 4,177,466 | A | | 12/1979 | Reagan |
| 4,818,998 | A | | 4/1989 | Apsell |
| 4,908,629 | A | | 3/1990 | Apsell |
| 5,223,844 | A | | 6/1993 | Mansell |
| 5,579,285 | A | * | 11/1996 | Hubert ....................... 367/133 |
| 5,654,718 | A | | 8/1997 | Beason |
| 5,933,098 | A | * | 8/1999 | Haxton ....................... 340/945 |
| 5,936,553 | A | | 8/1999 | Kabel |
| 6,076,039 | A | | 6/2000 | Kabel |
| 6,163,503 | A | * | 12/2000 | Gudbjornsson ................ 367/6 |
| 6,249,241 | B1 | * | 6/2001 | Jordan et al. ................. 342/41 |
| 6,363,320 | B1 | | 3/2002 | Chou |
| 6,522,265 | B1 | * | 2/2003 | Hillman et al. ............. 340/988 |

* cited by examiner

Primary Examiner—Dao Phan
(74) Attorney, Agent, or Firm—Technoprop Colton LLC (57) ABSTRACT A system for remotely tracking, monitoring and messaging vessels (14) utilizing a global positioning system satellite constellation, having a transceiver located on the vessel to be tracked and monitored, a monitoring center located remote from the vessel, a communications means allowing the bi-directional communication between the transceiver and the monitoring center, a communications means allowing the uni-directional communication from the global positioning system satellite constellation to the transceiver, sensors on the on-board systems of the vessel, a communications means allowing communication between the sensors and the transceiver, an input/output means for messaging, and a communications means allowing communication between the input/output means and the transceiver.

28 Claims, 6 Drawing Sheets

SYSTEM FOR TRACKING AND MONITORING VESSELS

STATEMENT OF RELATED APPLICATIONS

This patent application is the United States of America Patent Cooperation Treaty (PCT) Chapter II National Phase application of PCT International Application No. PCT/US02/31796 having an International Filing Date of 2 Oct. 2002 and which designates the United States of America, which claims priority on U.S. Provisional Patent Application No. 60/326,915 filed on 3 Oct. 2001.

BACKGROUND OF THE INVENTION

1. Technical Field

This invention relates generally to the field of tracking the position of vehicles and monitoring the systems of such vehicles, and relates more specifically to the field of tracking the position of sea-going commercial and pleasure vessels and monitoring the on-board system of such vessels.

2. Prior Art

Currently, the tracking of vehicles most often takes the form of plans in which the vehicle operators plan a route and file the route plan with the appropriate authority and logs in which the vehicle operators log in when and where the vehicle was for a certain time period and the actual course the vehicle transverses. While this type of tracking is inexpensive, it is dependent on the vehicle operator, who may not always be, or want to be, completely accurate.

Other forms of tracking methods include devices such as the Lo-Jack® device that, when activated, sends a radio signal that can be received by tracking devices. While this type of tracking method has had much success, it does not provide the exact positioning of the vehicle, but only provides the position of the vehicle relative to the tracking receiver. This device is covered by U.S. Pat. Nos. 4,908,629, 4,818,998, and 4,177,466.

The Global Positioning System (GPS) has added another dimension to tracking vehicles. Through the use of a relatively inexpensive receiver, one can determine exactly where the receiver is anywhere in the world. GPS receivers can be attached to transceivers to transmit the GPS receiver's location to a remote receiver, thus effectively tracking any vehicle in which the GPS receiver is located. Some GPS receivers are covered by U.S. Pat. Nos. 5,654,718, 5,936,553, and 6,076,039.

While there are many different types of tracking devices, not all are suitable for use with vehicles and even fewer are suitable for use with sea-going vessels. Additionally, tracking devices including GPS receivers alone cannot also monitor the mechanical, electrical and/or hydraulic systems of a vehicle. Vessel systems monitoring can be a desirable addition, especially remote vessel systems monitoring.

Thus, it can be seen that there exists a need for a relatively low-cost, simple to use and operate, reliable system for tracking the position and monitoring the systems of vehicles. There especially is a need for such a system for tracking the position and monitoring the on-board systems of sea-going vessels, which cannot simply pull off to the side of the road or into the nearest service station or rest area. The present invention is directed to these needs.

BRIEF SUMMARY OF THE INVENTION

Briefly, the present invention is a system for determining the location of a vehicle, for monitoring the status of the on-board systems of the vehicle, and for transmitting this information to a remote location. The present system comprises location means for determining the location of the vehicle, such as a global positioning system (GPS) receiver; monitoring means for monitoring the systems of the vehicle, such as pressure and temperature sensors; computing means for computing and storing the information obtained from the location means and the monitoring means, such as a microprocessor; and transmitting means for transmitting the obtained information to a remote location or monitoring center, such as a radio frequency (RF) transceiver. These various means preferably are combined in relatively small and inexpensive structures that are highly resistant to weather and other environmental and geographic factors. In a preferred embodiment, the present invention is for use on nautical-going vessels. In another preferred embodiment, the present invention is for use on aeronautical vessels. In still another preferred embodiment, the present invention is for use on terrestrial vessels.

In one embodiment, the present invention relies on communications between a first or primary terminal located on the vehicle and, ultimately, a second or remote terminal located at a location remote from the vehicle. The primary terminal utilizes small, inexpensive, high-performance RF transceiver that supports wide-area wireless data networks, or a mobile satellite terminal supporting regional L-Band satellite networks, or other similar or interchangeable satellite networks. The RF transceiver is capable of communicating with the remote terminal either directly or through repeater or relay stations, or through satellite linkages.

At least the primary terminal comprises an embedded 12-channel global positioning system (GPS) receiver, or a similar means for providing location information. As the GPS technology already is in place and usable by the general public, GPS is a preferred location determining means. The primary terminal, through the GPS receiver, obtains data from the GPS satellite array to determine the exact location of the vehicle. Through the RF transceiver, the primary terminal can transmit the location information to the remote terminal.

The primary terminal also interfaces with on-board local sensors to monitor vessel systems, such as bilge levels, AC and DC voltage, tank levels, alarms and other systems aboard the vessel. The interface can include, for example, a microprocessor that polls sensors or other microprocessors in the various vessel systems and obtains data from these sensors or other microprocessors. Through the RF transceiver, the primary terminal can transmit the vessel systems information to the remote terminal, either in raw data form or in a collated or otherwise transformed form.

The remote terminal can be selected from a myriad of choices. One choice is a private or governmental monitoring organization that receives the data from the primary terminal and retransmits the data to the party responsible for the vessel. Another choice is a computer or other device owned or operated directly by the party responsible for the vessel. Still another choice is the customs service, coast guard, or other military or quasi-military organization responsible for the safety of vehicles within the area or areas the vehicle is operating. In general, the remote terminal either comprises or is connected to an RF-transceiver or satellite downlink so as to be able to receive the data sent by the primary terminal, and further comprises the ability to decode and/or interpret the data and present the data to the user in a coherent format.

Optionally, the present invention can store data inputs and send encrypted reports via satellite or RF data networks to a land-based monitoring center in the form of a packet data transmission. Vessel condition reports, including vessel system monitoring reports, can be sent automatically from the primary terminal on the vessel to the remote terminal at predetermined intervals. The vessel operator also can transmit specific reports of mechanical problems, emergency conditions or text messages using the invention.

Also optionally, built-in links between the primary terminal and nautical charts can provide the location data of the vessel. The location data can be transmitted manually when desired, or automatically at predetermined intervals. To track the vessel's movement, the present invention can provide a polling feature in which the monitoring station comprising the remote terminal can poll the vessel's primary terminal and obtain the location information of the vessel from the GPS receiver within or cooperating with the primary terminal.

A feature of the present invention is to provide a system for tracking the position of a vessel by using a combination of components located in the vessel and of components located in a remote monitoring station that communicate with each other to determine the vessel's location.

Another feature of the present invention is to provide a system for monitoring the systems of a vessel by using a combination of system sensors interfacing with selected systems on the vessel and a remote monitoring station that communicate with each other to provide information about the operation of the vessel's systems.

A further feature of the present invention is to provide a system for the voiceless communication of a vessel's position, system operation, float or route plans, alarms and other information to a remote monitoring station.

These features and other features and advantages of the present invention will become more apparent to those of ordinary skill in the art when the following detailed description of the preferred embodiments is read in conjunction with the attached figures.

DETAILED DESCRIPTION OF THE PREFERRED EMBODIMENTS

The present invention provides vessel owners with the ability to track their vessel's location, monitor their vessel's on-board systems, and engage in real-time text messaging both while aboard and while not aboard their vessel. The system of the present invention comprises a tracking and monitoring system for both pleasure and commercial vessels. Further, the system of the present invention allows the remote monitoring of a vessel's location and operating status, for safety reasons (theft, fire, emergency), for commerce reasons (location relative to port, estimated time of arrival), and for maintenance reasons (condition of batteries, fluids, fuel).

Throughout this specification and in the claims, the terms vessel, vehicle and boat will be used interchangeably. Further, the preferred embodiments of the present invention will be disclosed in connection with a sea-going vessel as the illustrative embodiment. However, the present invention is applicable to all types of vehicles and machines. For example, the present invention is applicable to powered boats, trucks, airplanes and cars, as well as other vehicles. Further, the present invention is applicable to non-powered trailers and barges, as well as other mobile devices that are routinely moved and have secondary systems such as hydraulic brakes and electrical systems. Additionally, the present invention is applicable to non-mobile machines. Thus, in preferred embodiments, the present invention is for use on nautical-going vessels, aeronautical vessels, and terrestrial vessels.

Also throughout this specification and in the claims, the term RF transceiver refers to terminals supporting high frequency radio, or wide-area wireless data networks, or a mobile satellite terminal supporting regional L-Band satellite networks, or other similar or interchangeable satellite networks.

Using the present invention, a boat owner or, in the case of a charter fleet or commercial operator, a fleet manager, can track one or more vessel's position and monitor the status of one or more vessel's on-board systems remotely through an Internet or other network connection. In addition, from on-board the vessel, the vessel operator can use the present invention to open, modify and close float plans, to report problems, weather, accidents, and emergencies, and even to send text messages by means of a small, hand-held device operating on commercially available software. For example, the operating instructions for the present invention can be resident on any suitable computing device, such as a personal digital assistant (PDA) or other handheld computer using the Palm® OS or Windows CE® software, laptop computers, or larger desktop style computers.

Figure 1:
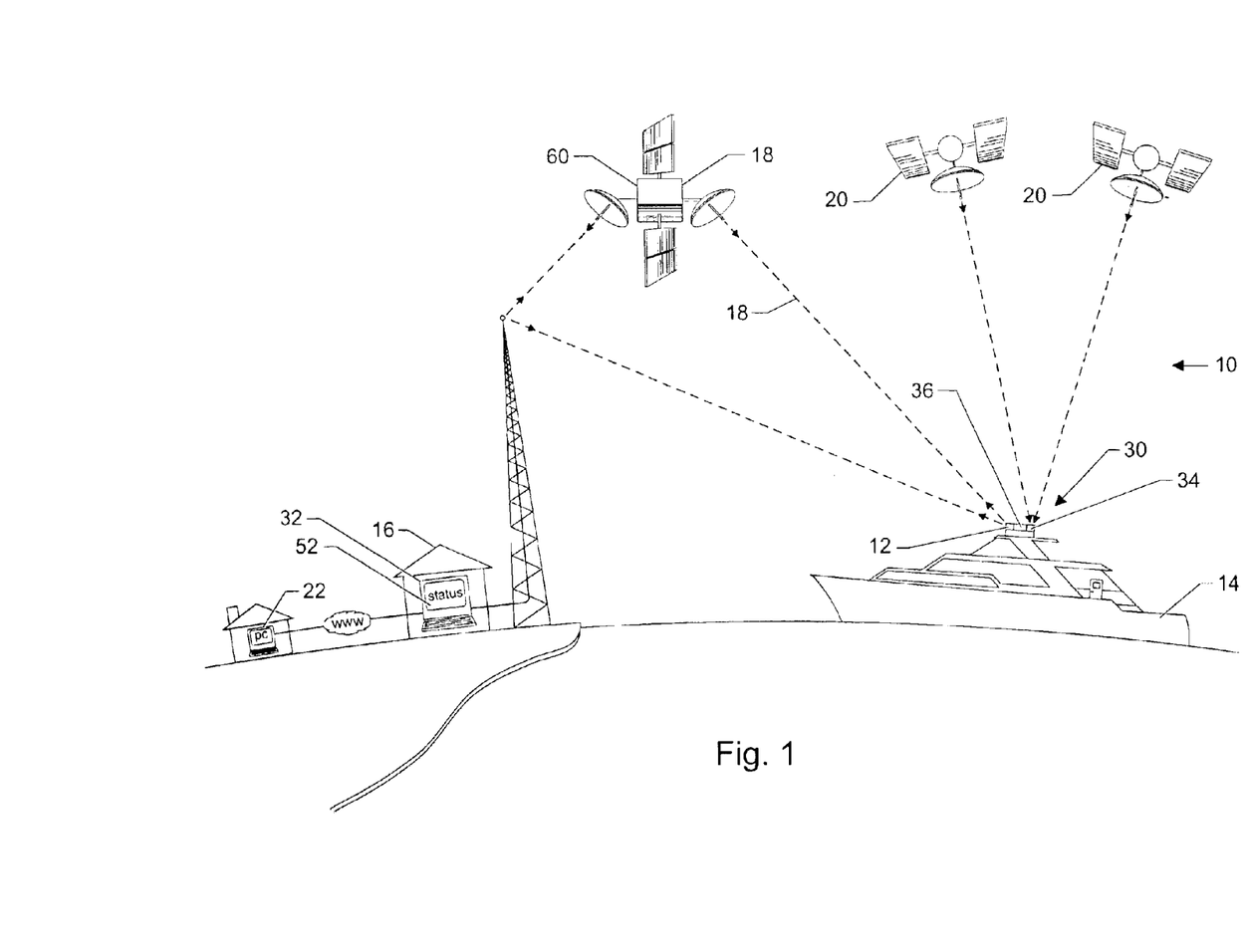
FIG. 1 is a representation of the system of the present invention in operation.
Figure 2:
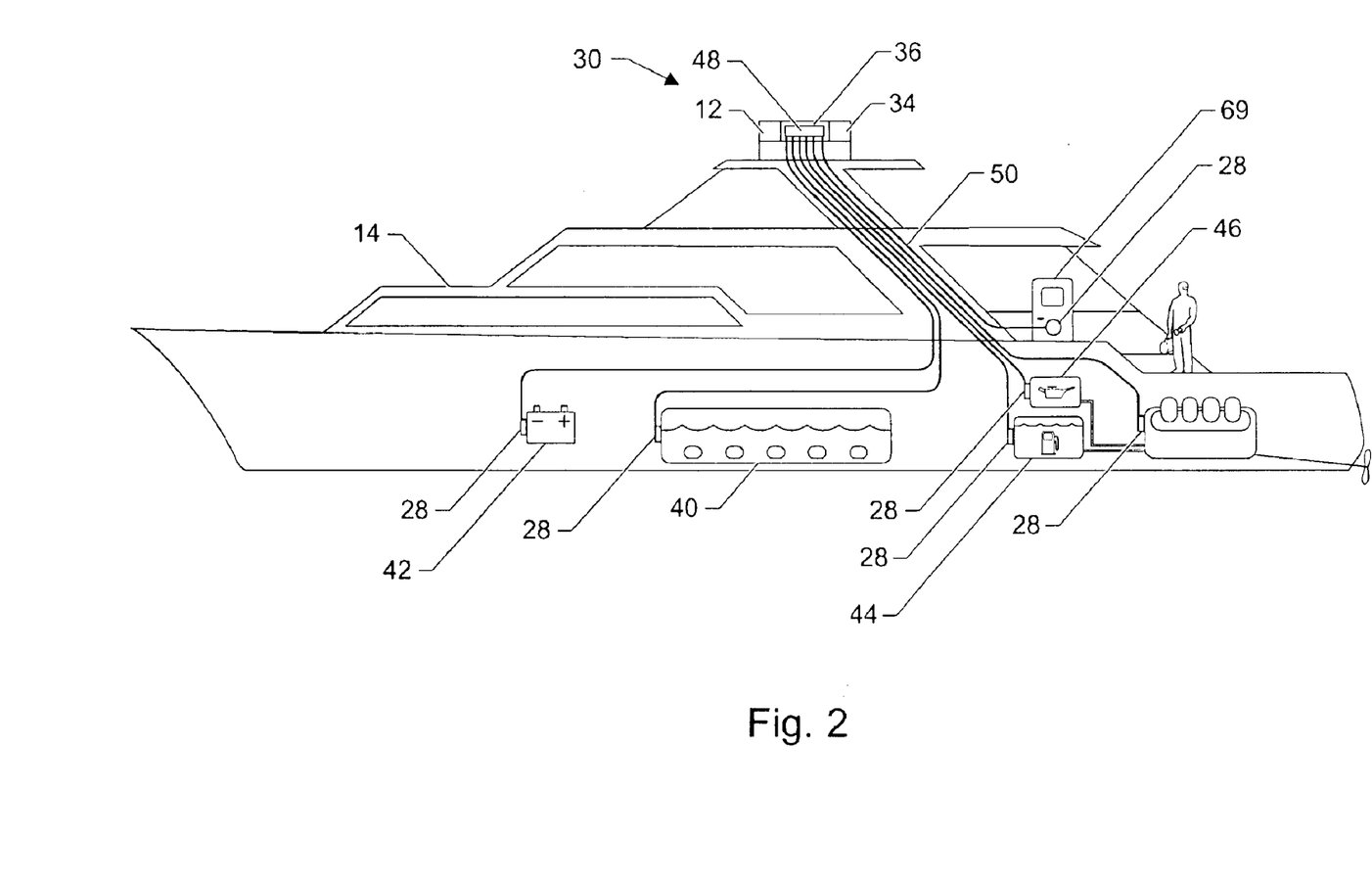
FIG. 2 is a sectional side view of a representative vessel comprising the system of the present invention.

Referring now to FIGS. 1 and 2, the present invention is a system 10 for determining the location of a vessel 14, for monitoring the status of the on-board systems of the vessel 14, and for transmitting this information to a remote location, such as a monitoring center 16. More specifically, the present system 10 comprises an on-board component, the first or primary terminal 30, that obtains and/or determines the vessel's 14 location and monitors the vessel's 14 systems, all referred to collectively as the vessel's status, and an off-board component, the second or remote terminal 32, for remotely monitoring the vessel's 14 status. The primary terminal 30 and the remote terminal 32 communicate with each other through any wireless communications system, such as for example electromagnetic wave-based transceivers including RF transceivers 12 or satellite links 18 as illustrative embodiments.

Within or connected to the primary terminal 30 is location means 34 for determining the location of the vessel 14, monitoring means comprising microprocessor 48 and sensors 28 for monitoring the systems of the vehicle 14, computing means 36 for computing and storing the information obtained from the location means 34 and the sensors 28, and transmitting means such as transceiver 12 for transmitting the obtained information to a remote location such as monitoring center 16. As such, the term primary terminal 30 as used herein is meant to comprise the location means 34, the microprocessor 48 of the monitoring means, the computing means 36 (which may be combined with or the same as microprocessor 48), and the transmitting means, whether these individual components are combined with each other, proximal to each other or separated from each other.

A preferred location means 34 is a global positioning system (GPS) receiver due to its accuracy, ease of use, and ready availability. Preferred monitoring means include sensors 28 such as pressure and temperature sensors, fluid level indicators, and electromagnetic meters. Preferred computing means 36 include computational devices such as a microprocessor, and can be in the form of any readily available computer. Preferred transmitting means include RF-transceivers 12 and optical transceivers capable of communicating with radio stations and repeaters, satellites, and other communications relay devices. These various means preferably are combined in relatively small and inexpensive structures that are highly resistant to weather and other environmental and geographic factors.

Referring now specifically to FIG. 1, the present system 10 relies on communications between the primary terminal 30 located on the vessel 14 and, ultimately, the remote terminal 32 located at a location remote from the vessel 14 such as at the monitoring center 16. The primary terminal 30 preferably comprises a first communications means allowing the bi-directional communication between the transceiver and the monitoring center, such as a small, inexpensive, high-performance RF transceiver 12 that supports wide-area wireless data networks, or a mobile satellite terminal supporting regional L-Band satellite networks 60, or other similar or interchangeable satellite networks. Such transceivers are known. The RF transceiver 12 is capable of communicating with the remote terminal 32 either directly or through repeater or relay stations, or through satellite 18 linkages.

At least the primary terminal 30 comprises a second communications means allowing the unidirectional communication from a global positioning system (GPS) satellite constellation to the primary terminal, such as an embedded 12-channel global positioning system (GPS) receiver, or a similar location means 34 for providing location information. As the GPS technology already is in place and usable by the general public, GPS is a preferred location means 34. The primary terminal 30, through the GPS receiver, obtains data from the GPS satellite array or constellation 20 to determine the exact location of the vessel 14. Such GPS receivers are known. Through the RF transceiver 12, the primary terminal 30 can transmit the location information to the remote terminal 32.

Referring now specifically to FIG. 2, the primary terminal 30 also interfaces with on-board local sensors 28 to monitor vessel 14 systems, such as bilge 40 levels, AC and DC voltage 42, tank 44 levels, alarms 46 and other systems aboard the vessel 14. The primary terminal 30 interface can include a third communications means allowing communication between the sensors 28 and the primary terminal 30, such as, for example, a microprocessor 48 that polls sensors 28 or other microprocessors in the various vessel 14 systems and obtains data from these sensors 28 or other microprocessors. Such sensors 28 are known. Through the RF transceiver 12, the primary terminal 30 can transmit the vessel 14 systems information to the remote terminal 32, either in raw data form or in a collated or otherwise transformed form.

The monitoring means, comprising microprocessor 48 or the equivalent connected to sensors 28 or the equivalent via connections 50, which can be hard wiring or wireless connections, can be any known or future means for monitoring the vessel's systems. Many such systems already are known in the art. For example, bilge 40 levels and fuel tank 44 currently are monitored by gauges showing whether the bilge 40 and fuel tank 44 are full, empty or somewhere in between. Similarly, voltages 42 currently are monitored by voltage meters that may show the level of battery charge remaining and whether the battery is charging or discharging. Oil pressure alarms 46 currently indicate whether the oil pressure or temperature is too high, too low, or acceptable. Security alarms 64 indicate security breaches. These and other sensors and alarms are centralized by the system 10 through the microprocessor 48 or other equivalent monitoring means. The monitoring means can monitor such systems as electrical systems, hydraulic systems, fluid systems, mechanical systems, electronic systems, power systems, alarm systems, operating systems, and combinations thereof.

The remote terminal 32 can be selected from a myriad of choices. One choice is a private or governmental monitoring organization or center 16 that receives the data from the primary terminal 30 and retransmits the data to the party responsible for the vessel 14. Another choice is a computer or other device owned or operated directly by the party responsible for the vessel 14. Still another choice is the customs service, coast guard, or other military or quasi-military organization responsible for the safety of vessels within the area or areas the vessel 14 is operating. In general, the remote terminal 32 either comprises or is connected to an RF-transceiver 12 or satellite downlink so as to be able to receive the data sent by the primary terminal 30, and further comprises the ability to decode and/or interpret the data and present the data to the user in a coherent format.

Optionally, the system 10 can store data inputs and send encrypted reports via satellite or RF data networks to the monitoring center 16 or other remote terminal 32 in the form of a packet data transmission. Vessel 14 condition reports, including vessel 14 system monitoring reports, can be sent automatically from the primary terminal 30 on the vessel 14 to the remote terminal 32 at predetermined intervals. More specifically, the system 14 can comprise an automatic mode that continuously records the vessel's 14 location and the vessel's status, and either continuously or at preset intervals transmits this data to the remote terminal 32. Alternatively or additionally, the vessel 14 operator also can transmit specific reports of mechanical problems, emergency conditions or text messages using the system 14.

Also optionally, built-in links between the primary terminal 30 and nautical charts can provide the location data of the vessel 14. Alternatively, the computing means 36 or the GPS receiver can be pre-loaded with nautical charts. As disclosed previously, the location data can be transmitted manually when desired, or automatically at predetermined intervals. To track the vessel's 14 movement, the system 10 can provide a polling feature in which the monitoring center 16 comprising the remote terminal 32 can poll the vessel's 14 primary terminal 30 and obtain the location information of the vessel 14 from the GPS receiver within or cooperating with the primary terminal 30.

The system 10 can reduce theft and insurance claims by acting as a round-the-clock security system. It is contemplated that users of the system 10 can subscribe to a monitoring service that will continuously monitor the vessel 14. For example, the user and the monitoring center 16, through an Internet or other site with password control, can access encrypted reports from the vessel 14. At a glance, the user, subscriber and/or the monitoring center 16 can see the vessel's 14 latest position on a nautical chart that can be embedded in the software of the system 10 and can view the status of the on-board systems of the vessel 14 on a graphic display screen 52.

A notification can be sent automatically to the user whenever an alarm 46 condition exists on the vessel 14. Further, a response organization such as the coast guard or a private security firm can be automatically notified, or notified by the user or monitoring center 16, when an alarm 46 is triggered. For example, when alerted by an alarm 46 or unauthorized movement, the vessel's 14 position can be tracked and relayed to the appropriate law enforcement agencies.

With the system 10 activated, a vessel's 14 owner or operator can file a float plan with the monitoring center 16. Preferably this is accomplished through a wireless device 26 operated by the operator on the vessel or elsewhere that interacts with the RF transceiver 12 on the vessel 14, which then transmits the float plan and/or other data to the monitoring center 16. The monitoring center 16 then can automatically track the vessel's 14 location and can note any deviation from the float plan. In addition, the system 10 can allow two-way messaging during the voyage. This is convenient for reporting problems or requesting commercial assistance when out of normal radio range. The system 10 further can comprise an emergency screen or feature that can be activated at any time to send a distress message to the monitoring center 16 to report a fire, sinking, illness, collision, seajacking, or other event.

Thus, as shown schematically in FIGS. 1 and 2, the system 10 can monitor the location of the vessel 14 and the on-board systems of the vessel 14, such as the mechanical, hydraulic, engine, electrical and other systems, and transmit related data to a remote terminal 32 or monitoring center 16. Using the system's 10 reporting and/or messaging capabilities, the monitoring center 16 can notify the vessel's 14 operator of required maintenance, such as when to change the engine oil, and can indicate the closest service facility to the vessel's 14 location. In this way, for example, charter operators and management companies can be certain that the chartered vessel is being operated within specified speeds and temperatures, as well as insuring that geographic cruising limits are not exceeded.

Figure 3:
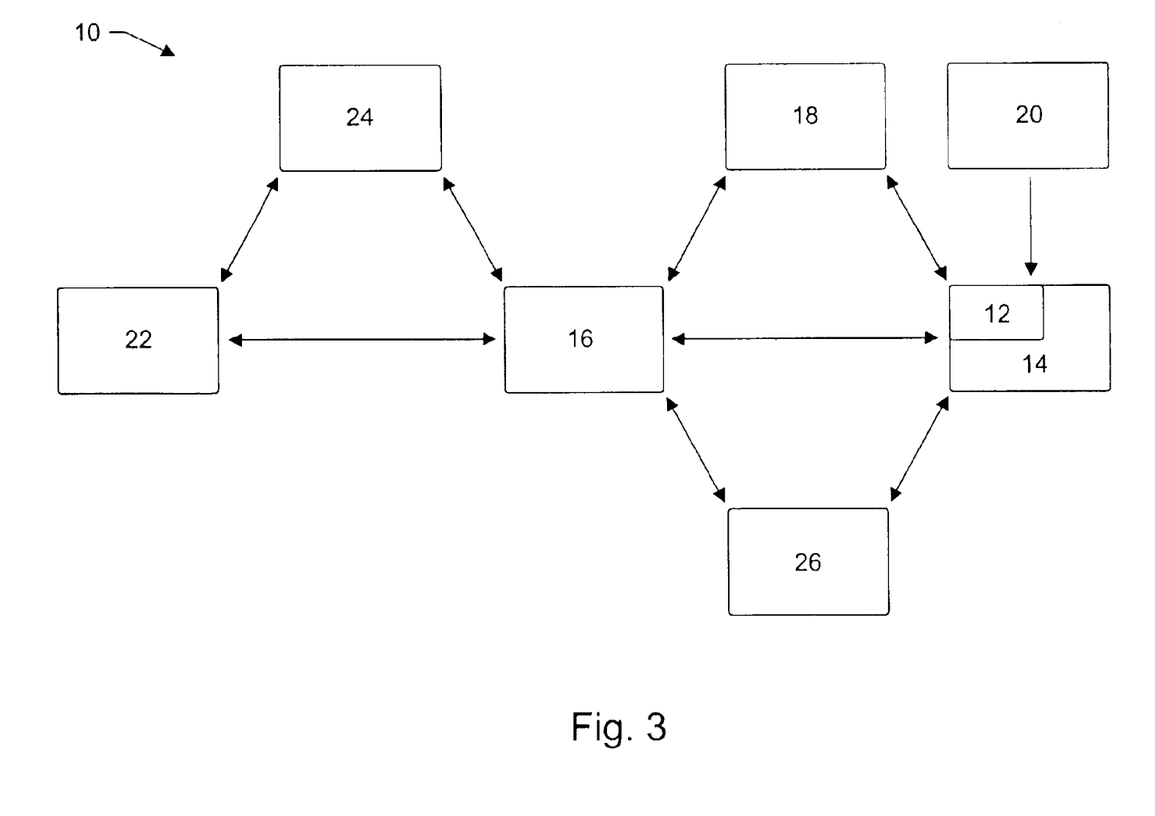
FIG. 3 is an illustration of the interconnection among the various components of the system of the present invention.

Referring now to FIG. 3, an illustration of the various components of the system 10 and how they interconnect is shown. The transceiver 12 preferably is securely mounted to the vessel 14 at a location where it can freely transmit to a monitoring center 16, a satellite 18 and/or a GPS constellation 20. The GPS constellation provides the transceiver 12 with location information that is transmitted from the vessel 14 to the monitoring center 16 either indirectly through the satellite 18 or directly by RF. The operator or user can access the information transceived between the vessel 14 and the monitoring center 16 by accessing a website maintained by the monitoring center 16 by a remote computer 22 and an Internet connection 24 connecting the remote computer 22 to the website of the monitoring center 16.

The user or operator, while on the vessel 14, can access the transceiver 12 via a wireless device 26. The wireless device 26 communicates with the transceiver 12 and may also communicate with the monitoring center 16 if within radio range of the monitoring center 16 or within range of a wireless cell system, such as that used for cellular telephones. The wireless device 26 can be loaded with both proprietary and non-proprietary software. For example, the wireless device 26 can have the ability to allow the user to monitor the vessel's 14 on-board systems, to ascertain the vessel's location, to send and receive text messages, and to create and edit float plans. Similarly, the wireless device 26 can allow the user to send an emergency signal or message.

The user or operator, while not on the vessel 14, can access the transceiver 12 also through the wireless device 26, as above. Also, the user or operator, while not on the vessel 14, can access the monitoring center 16, and the vessel's 14 information through the monitoring center 16, via the remote computer 22. The user or operator can log on to a website maintained by the monitoring center 16 over an Internet connection 24, and obtain the vessel's 14 information, as the transceiver 12 can automatically transmit the vessel's 14 information (such as position and on-board system status) to the monitoring center 16, where the information is stored. Further, the user or operator can create and edit float charts through the remote computer 22 and change certain settings on the vessel's 14 on-board systems.

Figure 4:
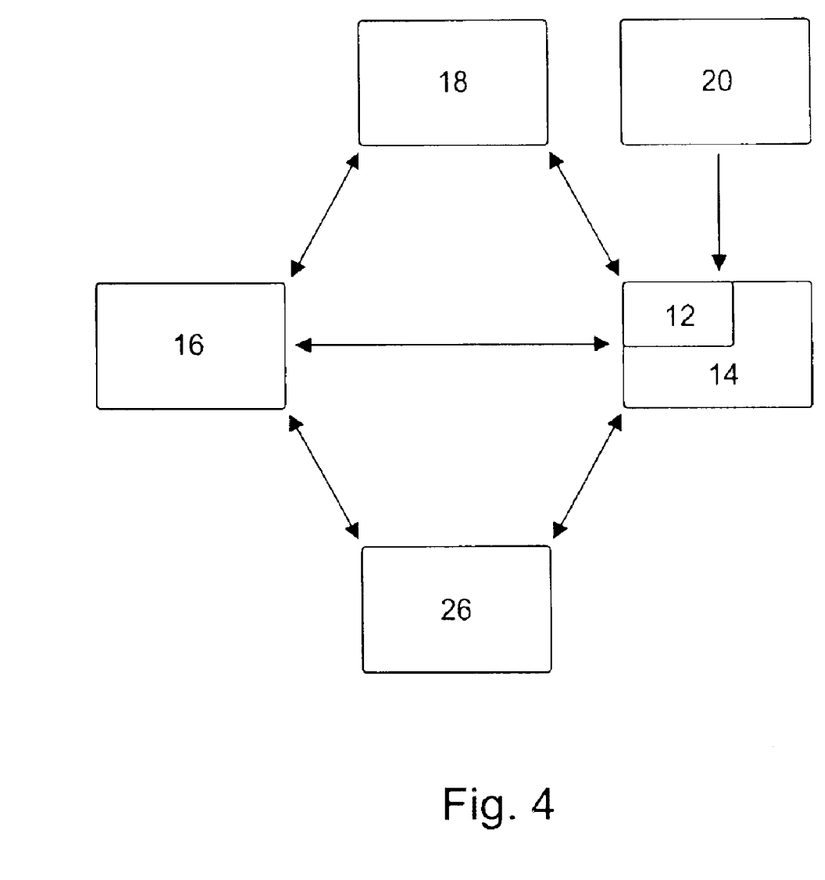
FIG. 4 is an illustration of the interconnection among the tracking components of the system of the present invention.

Referring now to FIG. 4, an illustration of the various components of the tracking portion of the system 10 and how they interconnect is shown. The system 10 utilizes the GPS satellite constellation 20, which can provide, through a GPS receiver, the exact location of the GPS receiver anywhere in the world. The transceiver 12 comprises or is connected to such a GPS receiver, preferably a 12-channel GPS receiver. As the GPS constellation 20 in theory is always on, the transceiver 12 is continuously receiving position information. This position information then is transmitted to the monitoring center 16 either through a separate satellite 18 or by RF, depending on the location of the vessel 14. As a result, the monitoring center 16 can track the exact position of the vessel 14 at all times, assuming the system 10 is on, and the satellite 18 and the GPS constellation are working properly.

The monitoring center 16, the wireless device 26, and the remote computer 22 all can have nautical charts preprogrammed into their respective computer memories. In this way, the monitoring center 16 can determine where the vessel 14 is located, and the user or operator also can make such a determination via the wireless device 26 or the remote computer 22. Further, the user or operator can access, create or edit float plans for the vessel 14 via the wireless device 26 or the remote computer 22 and be able to see actual nautical charts, making the use of the float plans more convenient.

Figure 5:
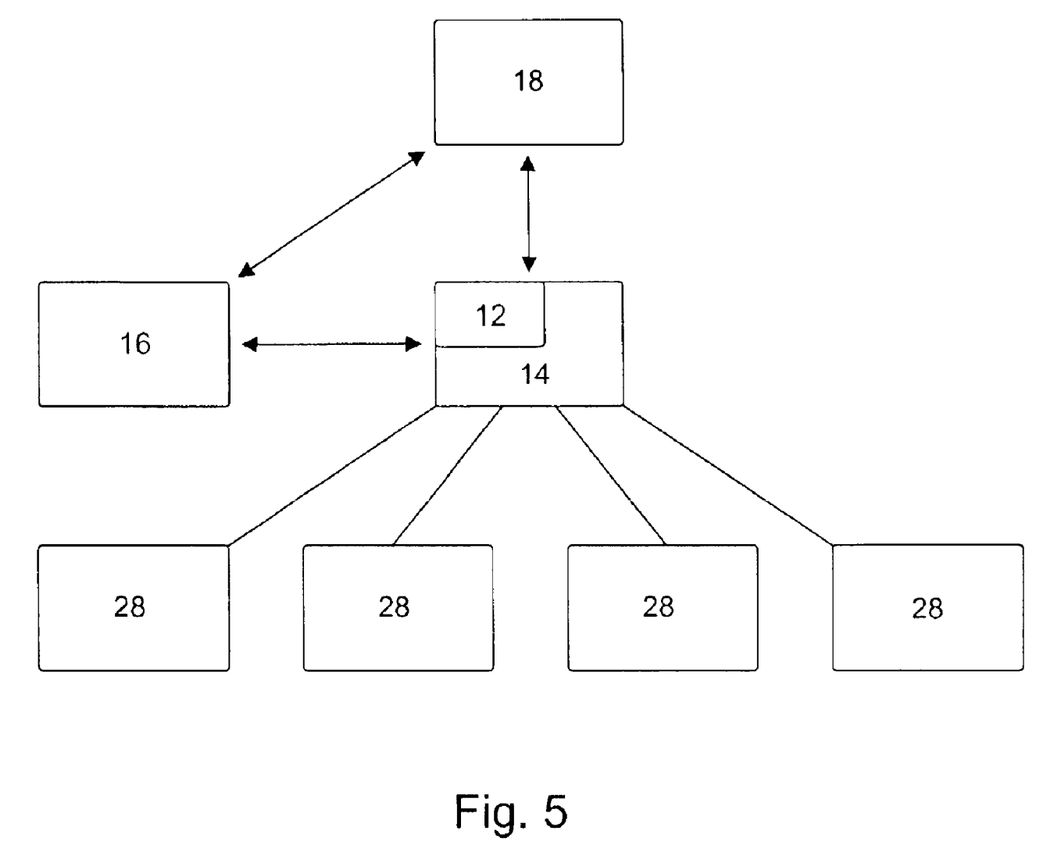
FIG. 5 is an illustration of the interconnection among the monitoring components of the system of the present invention.

Referring now to FIG. 5, an illustration of the various components of the monitoring portion of the system 10 and how they interconnect is shown. Various sensors 28 are attached to or incorporated in selected systems or components of the vessel 14. These sensors can measure or monitor the engine speed and temperature, the oil temperature and pressure, the battery DC voltage, and AC voltage running through the vessel's 14 wiring, the bilge levels, the fuel levels, and any other system desired by the user or operator. The sensors 28 communicate with the transceiver 12, which in turn communicates with the monitoring center 16 in the same manner as discussed above in connection with the tracking of the vessel 14.

The monitoring center 16 can monitor the vessel's 14 on-board systems and if any systems are performing out of specification, the monitoring center 16 can contact the operator. Similarly, the user or operator can access the vessel's 14 on-board system's information via the wireless device 26 or the remote computer 22 to check on the vessel's 16 systems. An option of the system 10 is to allow the user or operator to change the on-board system settings via the wireless device 26 or the remote computer 22.

Figure 6:
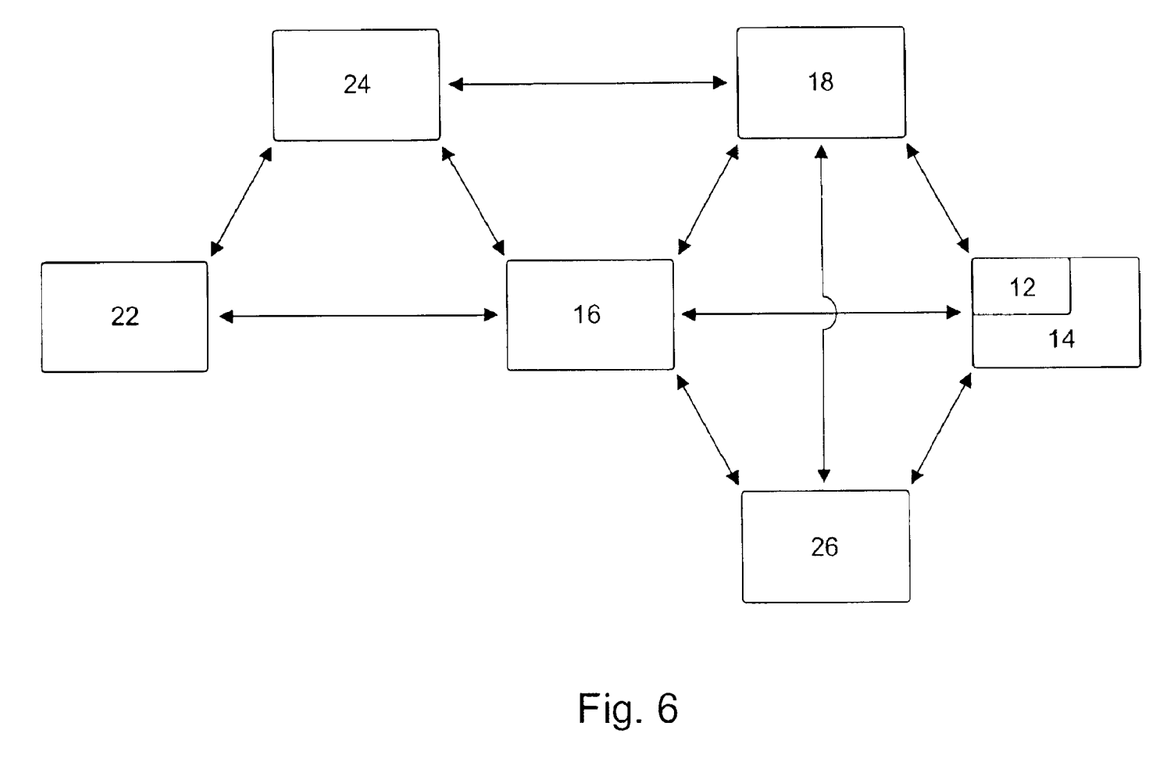
FIG. 6 is an illustration of the interconnection among the messaging components of the system of the present invention.

Referring now to FIG. 6, an illustration of the various components of the messaging portion of the system 10 and how they interconnect is shown. Generally, when the user or operator is on the vessel 14, the user or operator can send and receive messages via any common input/output means that interacts with the primary terminal 30 via a fourth communications means allowing communication between the input/output means and the transceiver 12. Messages can be sent from the monitoring center 16 to the wireless device 26, and vice versa, using any common text messaging service. Messages are sent by the monitoring center 16 to the transceiver 12 either directly or via the satellite 18, depending on the location of the vessel 14 or the choice of the sender. The transceiver 12 then communicates with the wireless device 26 and the user or operator can read the message on the wireless device 26. The user or operator can send messages back to the monitoring center 16 from the wireless device 26 in the same manner, but in reverse.

Similarly, messages can be sent to the vessel 14 from a remote computer 22. The user accesses a messaging service, inputs a message, and the message is sent to the vessel either through the monitoring center 16 or, via other conventional means, directly to the vessel 14. The user or operator can send messages back to the remote computer 22, or any remote computer from the wireless device 26 in the same manner, but in reverse.

The various components mentioned above are the preferred components. However, substitutions may be made. For example, the wireless device 26 can be replaced with a common computer hardwired to the transceiver 12 or networked wirelessly to the transceiver 12. The monitoring center 16 can be eliminated and the vessel 14 information can be sent directly to a remote computer 22. The Internet connection 24 can be eliminated and replaced with a direct link between the remote computer 22 and the monitoring center 16. These and other substitutions and replacement are well within the knowledge of those of ordinary skill in the field.

Although the present invention has been described with reference to preferred embodiments thereof, it is to be understood that these embodiments are for illustrative purposes and should not be construed as limitations on the scope of the invention. Accordingly, the spirit and scope of the present invention should not be determined by the embodiments illustrated, but by the claims appended hereto and their legal equivalents.

What is claimed is:

1. A system for remotely tracking the location of and monitoring the on-board systems of vessels, comprising:
   a. a primary terminal located on the vessel to be tracked and monitored;
   b. a remote terminal located remote from the vessel;
   c. a first communications means allowing bi-directional communication between the primary terminal and the remote terminal;
   d. a second communications means allowing uni-directional communication from a global positioning system satellite constellation to the primary terminal;
   e. at least one sensor on at least one of the on-board systems of the vessel; and
   f. a third communications means allowing communication between the at least one sensor and the primary terminal,
   wherein the primary terminal receives location information from the global positioning system satellite constellation via the second communications means, the primary terminal receives status information about the on-board systems from the at least one sensor via the third communications means, and the primary terminal and the remote terminal transceive between each other the location information and the status information via the first communications means.

2. The system as claimed in claim 1, wherein the first communications means comprises a transceiver selected from the group consisting of a radio frequency transceiver and an optical transceiver.

3. The system as claimed in claim 2, wherein the second communications means comprises a global positioning system receiver.

4. The system as claimed in claim 3, wherein the remote terminal is a monitoring center comprising means for monitoring the location information and the on-board systems status information of the vessel and means for allowing a party responsible for the vessel to access the location information and the on-board systems status information.

5. The system as claimed in claim 4, wherein the party responsible for the vessel can access the location information and the on-board systems status information in real time.

6. The system as claimed in claim 5, wherein the on-board system is at least one system selected from the group consisting of electrical systems, hydraulic systems, fluid systems, mechanical systems, electronic systems, power systems, alarm systems, and operating systems.

7. A system for remotely tracking the location of vessels, comprising:
   a. a first transceiver located on a vessel to be tracked;
   b. a global positioning system receiver located on the vessel;
   c. a monitoring center located remote from the vessel;
   d. a first communications means allowing bi-directional communication between the transceiver and a second transceiver located at the monitoring center; and
   e. a second communications means allowing uni-directional communication from a global positioning system satellite constellation to the global positioning system receiver,
   wherein the global positioning system receiver receives location information from the global positioning system satellite constellation via the second communications means, and the first transceiver transceives to the second transceiver transceive the location information of the vessel via the first communications means.

8. The system as claimed in claim 7, wherein the first transceiver comprises a transceiver selected from the group consisting of a radio frequency transceiver and an optical transceiver.

9. The system as claimed in claim 8, wherein the monitoring center comprises means for monitoring the location information of the vessel and means for allowing a party responsible for the vessel to access the location information.

10. The system as claimed in claim 9, wherein the party responsible for the vessel can access the location information in real time.

11. A system for remotely monitoring the on-board systems of vessels, comprising:
   a. a first transceiver located on a vessel to be monitored;
   b. a monitoring center located remote from the vessel;
   c. a first communications means allowing bi-directional communication between the transceiver and a second transceiver located at the monitoring center;

d. at least one sensor on at least one of the on-board systems of the vessel; and e. a third communications means allowing communication between the at least one sensor and the transceiver, wherein the first transceiver transceives status information about the at least one on-board system with the at least one sensor via the third communications means, and the first transceiver transceives to the second transceiver the status information via the first communications means.

12. The system as claimed in claim 11, wherein the first communications means comprises a transceiver selected from the group consisting of a radio frequency transceiver and an optical transceiver.

13. The system as claimed in claim 12, wherein the monitoring center comprising means for monitoring the status information of the vessel and means for allowing a party responsible for the vessel to access the status information.

14. The system as claimed in claim 13, wherein the party responsible for the vessel can access the status information in real time.

15. A real-time system for remotely tracking, monitoring and messaging boats, consisting essentially of:

a. a first transceiver located on the vessel to be tracked and monitored;

b. a monitoring center located remote from the vessel, wherein the monitoring center comprises means for monitoring the location information, the status information and the messaging and means for allowing a party responsible for the vessel to access the location information, the status information and the messaging;

c. a first communications means allowing the bi-directional communication between the first transceiver and a second transceiver located at the monitoring center;

d. a second communications means allowing the unidirectional communication from a global positioning system satellite constellation to a global positioning system receiver acting in cooperation with the first transceiver;

e. at least one sensor on at least one on-board system of the vessel, wherein the on-board system is at least one internal vessel system selected from the group consisting of electrical systems, hydraulic systems, fluid systems, mechanical systems, electronic systems, power systems, alarm systems, and operating systems;

f. a third communications means allowing communication between the at least one sensor and the first transceiver;

g. an input/output means for messaging; and h. a fourth communications means allowing communication between the input/output means and the first transceiver, wherein the global positioning receiver receives location positioning information from the global positioning system satellite constellation via the second communications means; the first transceiver is selected from the group consisting of radio frequency transceivers and optical transceivers and transceives status information about the at least one on-board system with the at least one sensor via the third communications means; the first transceiver transceives messaging from the input/output means via the fourth communications means; the first transceiver and the second transceiver transceives between each other the positioning information, the status information and the messaging via the first communications means; and a party responsible for the vessel can access the location information, the status information and the messaging in real time.

16. The system as claimed in claim 14, wherein the on-board systems are at least one internal vessel system selected from the group consisting of electrical systems, hydraulic systems, fluid systems, mechanical systems, electronic systems, power systems, alarm systems, and operating systems.

17. The system as claimed in claim 1, wherein the vessel is a pleasure vessel.

18. The system as claimed in claim 1, wherein the vessel is a commercial vessel.

19. The system as claimed in claim 1, wherein the system is not capable of controlling the vessel.

20. The system as claimed in claim 7, wherein the vessel is a pleasure vessel.

21. The system as claimed in claim 7, wherein the vessel is a commercial vessel.

22. The system as claimed in claim 7, wherein the system is not capable of controlling the vessel.

23. The system as claimed in claim 11, wherein the vessel is a pleasure vessel.

24. The system as claimed in claim 11, wherein the vessel is a commercial vessel.

25. The system as claimed in claim 11, wherein the system is not capable of controlling the vessel.

26. The system as claimed in claim 15, wherein the vessel is a pleasure vessel.

27. The system as claimed in claim 15, wherein the vessel is a commercial vessel.

28. The system as claimed in claim 15, wherein the system is not capable of controlling the vessel.

* * * * *